United States Patent
Dupont, Jr.

[11] Patent Number: 5,320,389
[45] Date of Patent: Jun. 14, 1994

[54] QUICK-CONNECT SANITARY HOSE FITTING

[75] Inventor: Paul R. Dupont, Jr., Andover, N.J.

[73] Assignee: Sani-Tech, Inc., Lafayette, N.J.

[21] Appl. No.: 915,297

[22] Filed: Jul. 20, 1992

[51] Int. Cl.⁵ .................................................. F16L 47/02
[52] U.S. Cl. ................................. 285/294; 285/328; 285/915
[58] Field of Search ............... 285/915, 423, 238, 297, 285/416, 912, 367, 328, 409, 410, 294

[56] References Cited

U.S. PATENT DOCUMENTS

| | | | |
|---|---|---|---|
| 1,251,973 | 1/1918 | Kurtz | 285/294 |
| 1,700,319 | 1/1929 | Kjekstad | 285/294 X |
| 2,399,103 | 4/1946 | Clinedinst | 285/297 X |
| 2,785,910 | 3/1957 | Munger | 285/297 X |
| 2,933,428 | 4/1960 | Mueller | 285/915 X |
| 3,563,571 | 2/1971 | Werra | 285/367 X |
| 3,776,996 | 12/1973 | Cameron et al. | 285/238 X |
| 3,847,694 | 11/1974 | Stewing | 285/297 X |
| 3,857,588 | 12/1974 | Curtin | 285/235 |
| 3,920,268 | 11/1975 | Stewing | 285/423 X |
| 3,989,281 | 11/1976 | Wilde, Jr. | 285/294 X |
| 4,152,014 | 5/1979 | Soeffker | 285/915 X |
| 4,326,737 | 4/1982 | Lehmann | 285/423 X |
| 4,420,176 | 12/1983 | Cornwall | 285/423 X |
| 4,804,209 | 2/1989 | Fisher | 285/423 X |
| 5,088,773 | 2/1992 | Gralenski | 285/328 X |

Primary Examiner—Randolph A. Reese
Assistant Examiner—Heather Chun
Attorney, Agent, or Firm—Howard R. Popper

[57] ABSTRACT

A quick-connect, clampable fitting for a flexible hose which comprises a flexible main body of plastic material that is moldable or otherwise affixable to the hose. The main body including an integral flange member having an O-ring ribbed sealing face. The main body nests within a separate reinforcing shell of steel which absorbs the stress applied by the make-up clamp. For affixing the main body to the hose in the filed an alternative embodiment of the main body includes a plurality of channels and galleries into which an adherent fluid may be injected. Silicone rubber is a preferred material for the main body and for the adherent fluid which may be vulcanized.

11 Claims, 1 Drawing Sheet

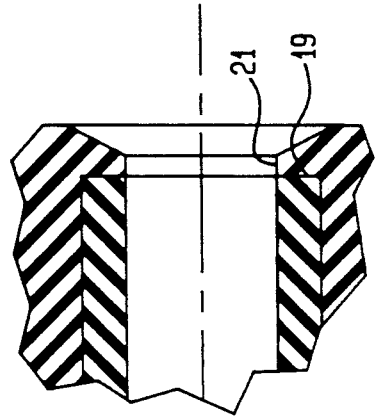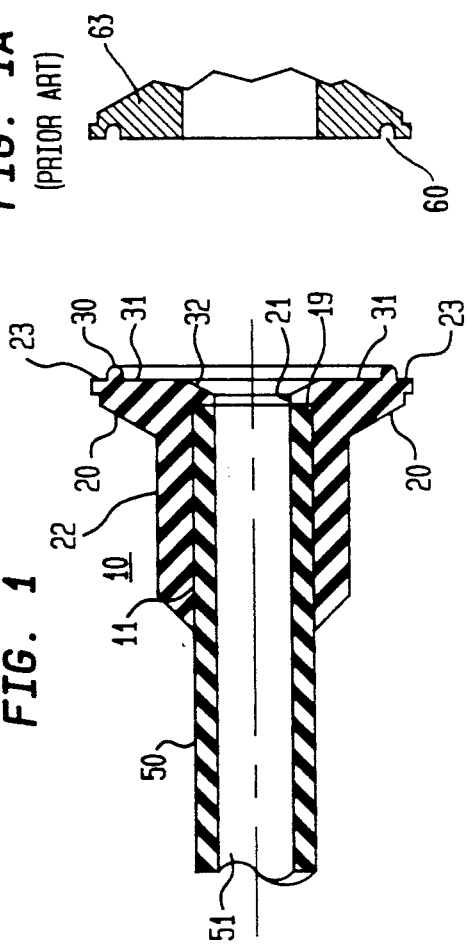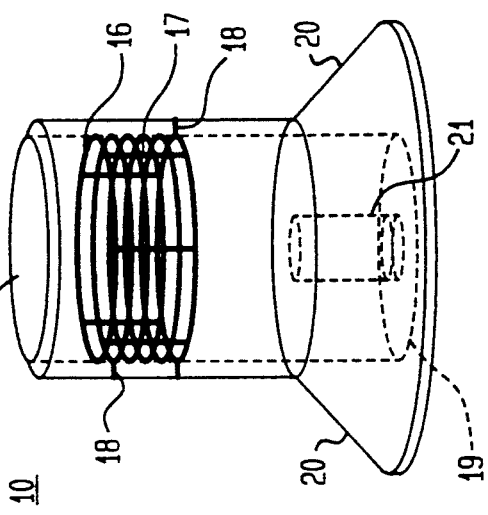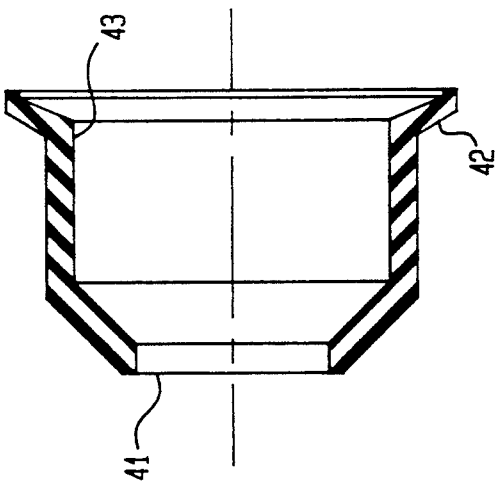

QUICK-CONNECT SANITARY HOSE FITTING

FIELD OF THE INVENTION

This invention relates to corrosion resistant, capillary-free fittings and, more particularly, to quick-disconnect fittings meeting sanitarian standards.

DESCRIPTION OF THE RELATED ART

Sanitary tubing, piping, hoses, and associated connectors used in the food processing and pharmaceutical industries must meet sanitary requirements such as those set forth in the United States Code of Federal Regulations, 7 C.F.R. §58.128. The standards provide that the conduit be smooth, permit laminar flow of fluids and be free of discontinuities that could trap particulate matter. The fluid path must also be free of crevices that could give rise to capillary action that might allow the fluid being transported to accumulate and possibly putrefy. Moreover, the need for frequent cleaning or inspection dictates that fittings for sanitary systems be readily demountable. A form of metallic quick-connect sanitary type fitting is shown in U.S. Pat. No. 3,563,571 issued in 1971 to the Ladish Co. of Cudahy Wis. That device employed adjacent pipe ends having outwardly projecting annular flanges whose opposing faces were formed with annular grooves. A gasket of slightly flexible but relatively hard plastic material was employed between the flanges. End faces of the gasket were provided with annular ribs which fit within the annular grooves of the flanges.

While the use of stainless steel pipe, tubing and fittings solves many corrosion problems, certain difficulties still remain when certain fluids must be carried. For this reason plastic pipe and tubing has come to be used necessitating the use of plastic fittings. In U.S. Pat. No. 4,398,879 issued Aug. 16, 1983 there is disclosed a portable apparatus that can be used at a job site to fabricate a type of rigid plastic pipe fitting.

With respect to fittings for flexible hoses U.S. application Ser. No. 07/628,610, filed Dec. 17, 1990 now U.S. Pat. No. 5,176,411, describes a reusable stainless steel coupling that provides an essentially capillary-free connection. However, that device consisting of all metal parts could be quite heavy. Moreover that fitting as well as other fittings whether of plastic or metal generally require that a flexible gasket be used between the mating faces to effectuate a seal. Unfortunately, the usual form of gasket can be dislodged or misaligned during the make-up of the joint, thereby impairing the sanitary integrity of the connection. In addition it may be pertinent to the ultra-pure transport of certain materials that the tubing and fittings be used to transport only one batch of material and then be discarded. For such an application it becomes especially important that the tubing and fittings be light weight and economically affordable. It would, accordingly, be advantageous to provide a corrosion-free quick-disconnect fitting for flexible hoses and tubing that is light in weight and which obviates the need to use and/or align a gasket during the make-up of a connection.

SUMMARY OF THE INVENTION

In accordance with the principles of my invention, a preferred embodiment of a quick-connect, corrosion-free fitting for a sanitary hose comprises a body including a flange advantageously made of a flexible plastic material such as silicone rubber having a central bore dimensioned to align with the lumen of the hose. The front face of the flange is provided with an integral, annular or semi-toroidal, rib, or bead, or "O"-ring cross-section while the rear face is made to nest within a separate reinforcing shell. The tubing or hose to which the connection is to be made is passed through a central aperture in the reinforcing shell. The body of the fitting is provided with a plurality of gates and galleries through which a readily vulcanizable plastic may be introduced to permanently affix the fitting to the hose. The outer surface of the reinforcing shell may advantageously be provided with a set of the standard forms of bevel used with quick-connect clamp, preferably of the aforementioned "Tri-Clover" type.

BRIEF DESCRIPTION OF THE DRAWING

The foregoing and other objects and features of the invention are described in detail in the ensuing specification and drawing, in which:

FIG. 1 shows a cross sectional view of a hose together with the main body and flange of an illustrative embodiment of the fitting of my invention;

FIG. 1a shows a standard sanitary fitting;

FIG. 2 shows the reinforcing shell designed to fit over the main body of the fitting of FIG. 1;

FIG. 3 shows an enlarged view of the flange of FIG. 1; and

FIG. 4 shows the details of the gates and galleries of the main body of the fitting.

DETAILED DESCRIPTION

Referring to FIG. 1, there is shown a cross-section through the end portion of a length of hose 50 which conventionally may be made of flexible plastic material such as rubber, especially silicone rubber or the like. In accordance with my invention there is first slipped over the end of hose 50 a light weight but sufficiently strong reinforcing shell 40 which is shown in FIG. 2. Shell 40 which, advantageously may be fabricated of stainless steel, has a central aperture 41 through which the end of hose 50 is passed. The end of shell 40 opposite aperture 41 is widened into a flange portion 42 whose outer countour is shaped so as to mate with a quick-connect clamp (not shown) of conventional design, such as the clamp shown in the aforementioned Ladish Co. patent. The inner countour 43 of shell 40 is dimensioned so that its shape snugly embraces the outer countour of flexible flange 20, of the main body 10. In other words the concave interior surface 43 of shell 40 is shaped complementarily to the convex, nesting surface 22 of main body 10. Shell 40 functions to support and protect flange 20 from the stresses that induced when the quick-connect clamp (not shown) as disclosed in the above-mentioned Ladish patent clamp is tightened to make-up the fitting of my invention to a standard quick-connect sanitary fitting. The stresses induced by the clamp are distributed over the chamfered external surface 42 of shell 40.

The main body 10 of my fitting shown in FIG. 1, has a central bore 11 to receive the outside dimension of the end of hose 50 and a lumen 21 which matches the lumen 51 of hose 50. Main body 10 includes an integral flexible blared flange seal portion 20. A portion of the anterior face of flexible flange 20 includes a raised rib 30 having a demi-toroidal cross-section, i.e., one adapted to provide an "O-ring" type of seal with the annular groove (not shown) of the conventional Ladish patent type flange. The radially innermost sealing face portion 32 of flange 20 may advantageously be slightly tapered toward hose lumen 21.

As shown more clearly in enlarged view of FIG. 3, the main body 10 is provided with a shoulder 19 against which the end of hose 50 abuts. The inner dimensions of the countour 40 of shell 40, the outer contour of flexible flange 20, the diameter of central bore 11 and the position of shoulder 19 of main body 10 are controlled so that the lumen 51 of hose 50 will be in alignment with the lumen 21 of flange 20 when the clamp (not shown) clamps shell 40 to the rigid sanitary flange (not shown).

While the main body 10 of my fitting may be factory molded to the hose 50 it is desirable to provide an alternative form of main body which is adapted for field-fitting to a hose. Referring now to FIG. 4 the alternative embodiment of a main body 10 is advantageously provided with a plurality of galleries 16 which are disposed circumferentially about central bore 11. A plurality of internal longitudinal gates 17 which are orthogonal to galleries 16 communicate between the plurality of internal circumferential galleries 16. A plurality of radial sprues 18 on the exterior of main body 10 communicate with the circumferential galleries 16. Alternatively (but not shown) the sprues 18 may communicate with the longitudinal gates 17 or with the gates as well as the galleries. The network of channels including the aforementioned gates, galleries and sprues facilitate the introduction of an adherent such as liquid silicone rubber so that main body 10 can be bonded to hose 50. Advantageously, the adherent may be squirted into one of sprues 18 while any entrapped air is expelled through another of the sprues. To bond the main body 10 to hose 50, a mandrel (not shown) may be inserted through lumen 21 of the flange and extending into lumen 51 of hose 50. A curable silicone rubber fluid is then injected through the sprue 18 to fill the gates 17 and then galleries 16 with a silicone rubber compound. Exemplary, silicone rubbers are such polymeric compounds as undergo a cross-linking (vulcanization) of carbon atoms by free-radical reactions when heated properly. Vulcanization will cause the silicone compound to become silicone rubber, permanently bonding hose 50 to main body 10 and flange 20. The communicating network of gates and galleries allows the silicone fluid to come into contact with the outside surface 53 of hose 50, thereby bonding main body 10 to hose 50 when the silicone rubber fluid cures. Any air in the communicating network of gates and galleries is expelled through an unused sprue 18.

It is to be appreciated that various diameter hose may be accommodated by having the internal diameter of central bore 11 snugly fit over the outside diameter size of the hose with which the fitting of my invention is to be used. In addition, it is to be appreciated that sanitary specifications referred to at the outset of the description herein dictate that the fit be such that no crevices are permitted. Accordingly, the dimensions of the internal bore 11 must be chosen in relation to the hose size such that lumen 51 of the hose and the lumen 21 of the flange 20 will be kept in alignment with no steps or crevices being permitted. Further, it is to be appreciated that the flange nesting face 22 and the retaining face 43 of the reinforcing shell are to have complementary shapes so as to preserve flat the radially outer and inner margins 23 and 31, respectively, of the anterior sealing face of flange 20 which includes O-ring rib 30. In addition, it should also be appreciated that integral O-ring rib 30 shall be positioned radially of flange lumen 21 so as to be in alignment with the semi-toroidal recess 60 of the standard sanitary flange 63 with which the fitting of my invention is to be made up.

EXAMPLES

In one illustrative embodiment for use with a flexible hose having nominal inner diameter [ID] of 0.3750", outer diameter [OD] of 0.6250", and being made of Silicone STHT rubber (exhibiting a surface finish of 1000 grit fineness and 0.22 micron pore size, the dimensions in inches of the coupling were as follows:

| Ref. | Name | Dimensions | |
|---|---|---|---|
| 10 | main body | | 1.000 |
| | | OD | 1.250 |
| 11 | main body bore | | 1.000 |
| 16 | galleries | length | 1.000 |
| | | depth | 0.0313 |
| | | diameter | 0.0625 |
| 17 | gates | | |
| 18 | sprue | length | 0.3125 |
| | | diameter | 0.0625 |
| 20 | flexible flange | diameter | 1.9375 |
| | | length | 0.1875 |
| 21 | flange lumen | | 0.3750 |
| 30 | flange rib ("O-ring") | diameter | 2.0625 |
| | | length | 0.1250 |
| | | O-ring OD | 1.8125 |
| | | O-ring ID | 1.6250 |
| 40 | rigid shell | OD #1 | 2.0625 |
| | | ∠30° OD #2 | 1.3125 |
| | | ID #1 | 1.9375 |
| | | ∠30° ID #2 | 1.2500 |
| | | ∠45° ID #3 | 0.6250 |
| 41 | rigid shell aperture | ID | 0.627 |
| 50 | hose | OD | 0.6250 |
| | | ID | 0.3750 |
| 51 | hose lumen | | |

Numerous variations in these shapes and dimensions will be apparent to those skilled in the art and may be made without, however, departing from the spirit and scope of my invention.

I claim:

1. A quick-connect sanitary fitting for clampable connection of a hose to a rigid sanitary flange (63) comprising:
    (a) a main body (10) of flexible plastic material having a central bore (11) for receiving an end of said hose, a network of channels in communication with said central bore and a flange (20) having an anterior sealing face and a posterior nesting face, said sealing face including an integral rib seal (30); and
    a cup-shaped reinforcing shell (40) having a circumferentially chamfered clampable outer surface (42), a central aperture (41) for admitting said hose (50), and a concavity (43) shaped to conform closely to the exterior shapes of said main body and the posterior face (22) of said flange (20) for retaining said main body and said flange (20), said reinforcing shell preventing distortion of said main body and said flexible flange when clamped to said rigid sanitary flange.

2. A sanitary hose fitting according to claim 1, wherein said network of channels in communication with said central bore includes a sprue for transporting a fluid to adhere said main body to said hose.

3. A sanitary hose fitting according to claim 2, wherein said fluid is silicone rubber.

4. A sanitary hose fitting according to claim 2, wherein said fluid for vulcanizing is a curable silicone rubber.

5. A sanitary hose fitting according to claim 1, wherein said flange includes a lumen (21) of the same diameter as the lumen (51) said hose.

6. A sanitary hose fitting according to claim 5, wherein said central bore includes means for maintaining the lumen of said hose end in alignment with said lumen (21) of said flange (20).

7. A sanitary hose fitting according to claim 5, wherein said central bore (11) means for maintaining said alignment includes a shoulder (19) against which said hose end (50) butts when said hose end is inserted into said bore.

8. A sanitary hose fitting according to claim 1, wherein said central bore of said main body includes a lumen of the same diameter as the lumen of said hose.

9. A sanitary hose fitting according to claim 1, wherein said network of channels includes a plurality of communicating gates (17) and galleries (16).

10. A sanitary hose fitting according to claim 9, wherein said galleries (16) and said gates (17) are mutually orthogonal to each other.

11. A sanitary hose fitting for clampable connection of a hose (50) having a lumen (51) to a rigid sanitary flange (60, 63) comprising:
  (a) flexible member (10) having
    (i) a lumen (21) bondable to the end of said sanitary hose (50),
    (ii) a shoulder (19) within said lumen,
    (iii) an integral flared flange seal portion (20, 23, 30, 31) including a sealing face (31) and an integral O-ring rib (30),
    (iv) a hose attachment tube portion (11, 22) for admitting said hose (50) end; and
  (b) a rigid reinforcing shell (40) having
    (i) a circumferentially chamfered clampable outer surface (42),
    (ii) a concavity (43) for retaining said flexible flange member,
    (iii) a central aperture (41) for admitting said hose into said flexible member (10),
said reinforcing shell surrounding said hose attachment tube portion (22) and said flared flange seal portion (20) to stiffen said sealing face (31, 23) radially of said integral O-ring rib when clamped to said rigid sanitary flange, said maintaining said flange lumen (21) in alignment with said hose lumen (51), thereby providing an essentially capillary-free connection of said hose (50) to said rigid sanitary flange (60).

* * * * *